(12) United States Patent
Giegold et al.

(10) Patent No.: US 7,999,760 B2
(45) Date of Patent: Aug. 16, 2011

(54) METHOD FOR A DISTORTION-FREE DISPLAY

(75) Inventors: Juergen Giegold, Neufahrn (DE); Sebastian Loh, Munich (DE); Thomas Mangold, Munich (DE); Martin Pinsker, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 900 days.

(21) Appl. No.: 11/964,944

(22) Filed: Dec. 27, 2007

(65) Prior Publication Data

US 2008/0165084 A1 Jul. 10, 2008

Related U.S. Application Data

(63) Continuation of application No. PCT/EP2005/006966, filed on Jun. 29, 2005.

(51) Int. Cl.
*G09G 5/00* (2006.01)

(52) U.S. Cl. ........ 345/7; 345/8; 345/9; 349/11; 359/630

(58) Field of Classification Search .................. 345/7–9, 345/204; 349/11; 359/630, 618, 709
See application file for complete search history.

(56) References Cited

U.S. PATENT DOCUMENTS

| | | | | |
|---|---|---|---|---|
| 5,278,532 | A | * | 1/1994 | Hegg et al. .................. 345/7 |
| 6,675,075 | B1 | | 1/2004 | Engelsberg et al. |
| 6,750,832 | B1 | * | 6/2004 | Kleinschmidt ............... 345/7 |
| 2003/0169213 | A1 | * | 9/2003 | Spero ........................ 345/7 |

FOREIGN PATENT DOCUMENTS

| | | |
|---|---|---|
| DE | 199 51 001 A1 | 5/2001 |
| DE | 100 46 019 A1 | 3/2002 |
| EP | 0 946 893 B1 | 10/1999 |
| EP | 1 460 583 A1 | 9/2004 |

OTHER PUBLICATIONS

International Search Report dated Nov. 17, 2005 with English translation of relevant portion (Four (4) pages).

* cited by examiner

*Primary Examiner* — Quan-Zhen Wang
*Assistant Examiner* — Jennifer Nguyen
(74) *Attorney, Agent, or Firm* — Crowell & Moring LLP

(57) ABSTRACT

A method is provided for a distortion-free display of image elements, which are composed of computer-generated pixels and are reflected on a non-planar reflective surface, in particular a windshield of a motor vehicle. According to this method, pre-distorted image data are calculated by a computer unit in an operating phase as a function of the distortion properties of the reflective surface from the original image data of the image elements in accordance with the display-related pre-distortion parameters and are transferred to a display unit, which projects the image elements onto the reflective surface. In order to obtain the display-related pre-distortion parameters, at least one image element is provided, pre-distorted and projected in the form of original image data in a calibration phase in a procedure that is analogous to the operating phase; and the image data resulting from the projection are recorded using a camera and image processing, and compared with the original image data. During the calibration phase, at least two image data sets resulting from the projection are recorded from different camera positions and/or camera viewing angles.

19 Claims, 1 Drawing Sheet

METHOD FOR A DISTORTION-FREE DISPLAY

CROSS-REFERENCE TO RELATED APPLICATIONS

This application is a continuation of PCT International Application No. PCT/EP2005/006966, filed on Jun. 29, 2005, the entire disclosure of which is expressly incorporated by reference herein.

BACKGROUND AND SUMMARY OF THE INVENTION

The invention relates to a method for a distortion-free display of image elements, which are composed of computer-generated pixels and are reflected on a non-planar reflective surface, in particular a windshield of a motor vehicle. According to the method, pre-distorted image data are calculated by a computer unit in an operating phase, as a function of the distortion properties of the reflective surface, from the original image data of the image elements in accordance with the display-related pre-distortion parameters. The image data are transferred to a display unit, which projects the image elements onto the reflective surface. In order to obtain the display-related pre-distortion parameters, at least one image element is provided, pre-distorted and projected in the form of original image data in a calibration phase in a procedure that is analogous to the operating phase. The image data resulting from the projection are recorded using a camera and image processing and compared with the original image data.

In order not to divert the gaze or distract the concentration of the driver from the traffic situation, modern motor vehicles employ so-called head-up displays, which make it possible to bundle the graphical and textual information in the driver's field of vision by a reflection on the windshield.

A head-up display usually comprises, besides the windshield, which acts as a reflective surface, a computer unit in order to calculate the image data; a display unit, which projects the image elements on the reflective surface; and optical elements—for example, mirrors and/or prisms and/or lenses—which are arranged in front of the reflective surface, in order to influence the beam path of the light emitted by the display unit.

The projection of the computer-generated images on a non-planar reflective surface contains various types of imaging errors, which are perceived to some degree directly by the viewer, but then to some degree are not detected subjectively.

However, in the extreme case and when viewed for a prolonged period of time, an imperfect image can lead to discomfort, disequilibrium and headaches. These errors are usually influenced by the following important imaging error sources, in particular in the above-described head-up displays for motor vehicles.

Predictable imaging error sources ensue, for example, from the fundamental shape of a reflective surface and its basic arrangement with respect to the display unit and the optical elements. The motor vehicle sector usually uses different types of windshields, which exhibit in particular a variety of curvature characteristics, for different types of vehicles. Furthermore, these windshields are mounted in a number of different ways. Such predictable imaging error sources are the main influencing factor for subjectively imperceptible imaging errors. Predictable imaging error sources are usually of a static nature—that is, do not depend on the position of the viewer's eye.

Unpredictable imaging error sources are the result of production and installation tolerances. They may affect both the reflective surface itself and an image-generating display unit or intercalated optical means. In a suitable configuration of the projection optics, these unpredictable imaging error sources have usually only an insignificant (that is, within the acceptance range of the viewer) effect on the subjectively imperceptible imaging errors. However, the influence of the unpredictable imaging error sources on imaging errors ("distortions") that are subjectively directly detectable often significantly exceeds the viewer's perception threshold. The unpredictable imaging error sources cause both static and dynamic (that is, depend on the position of the eye of the viewer) distortions.

The static predictable imaging error sources may be largely compensated by suitably configured optical elements, especially in order to compensate for imaging errors, which are subjectively not directly perceptible. This feature is commensurate with the prior art. However, it is obvious that the unpredictable imaging error sources cannot be compensated by means of such optical elements.

Unpredictable imaging error sources, which are caused by production tolerances of the projection optics, can be compensated to a limited degree by a subsequent fine positioning of the display unit and/or the optical elements. However, such a fine positioning is very time-consuming and labor-intensive and can be performed only by a person skilled in the respective art. In addition, achieving a satisfactory result is not always guaranteed. Dynamic imaging error sources are totally ignored.

German patent document DE 100 46 019 A1 discloses a method for a distortion-free display of image elements, which are composed of computer-generated pixels and are reflected on a non-planar reflective surface. According to this method, the image elements are pre-distorted before their reflection on the reflective surface in a correction step that is executed by a computer unit. The correction step is carried out in that a pre-distortion program converts the coordinates of each pixel into pre-distorted coordinates as a function of the distortion properties of the reflective surface. The DE 100 46 019 A1 describes a table-based method for executing the correction step. According to this method, the pre-distorted coordinates of each pixel are calculated by adding its previously calculated coordinates with the displacement coordinates, which are assigned to these coordinates. In order to obtain the displacement coordinates, a projected test image is captured with a camera, and then the recorded image data are compared with the originally provided image data. The method, described in DE 100 46 019 A1, has a plethora of drawbacks. First of all, only the effect of static imaging error sources can be compensated with the pre-distortion. Secondly, the display can be optimized only for viewing from the position of the camera. Consequently the results are usually suboptimal when viewing from any other viewing position. For example, optimization of the display for a single viewing position may result in an over-correction in the fringe areas. Another major drawback of a method in accordance with DE 100 46 019 A1 concerns specifically the operating phase of the head-up display. The described table-based method, which runs in the operating phase of the head-up display, is very memory- and computation-intensive at a high image resolution. It is not possible to realize the transfer of the operating principle of the method for compensating dynamic imaging error sources, which would require a fluent switching between different tables, with the computational power and the memory capacity for the graphics processes that are typically available at reasonable costs on board a motor vehicle. An increase in the computational power and/or memory capacity would involve additional costs. The transfer of all of the data into the motor vehicle would involve long coding times.

The invention provides a camera-based method, by which a distortion-free viewing from different viewing positions and/or viewing angles is made possible.

According to the invention, a method is provided for a distortion-free display of image elements, which are composed of computer-generated pixels and reflected on a non-planar reflective surface. According to the method, pre-distorted image data are calculated by a computer unit in an operating phase, as a function of the distortion properties of the reflective surface, from the original image data of the image elements in accordance with the display-related pre-distortion parameters. The image data are transferred to a display unit, which projects the image elements onto the reflective surface. In order to obtain the display-related pre-distortion parameters, at least one image element is provided, pre-distorted and projected in the form of original image data in a calibration phase in a procedure that is analogous to the operating phase. At least two image data sets resulting from the projection are recorded from different camera positions and/or viewing angles using a camera and image processing, and are compared with the original image data. The inventive method is especially suitable for a distortion-free display of image elements, which are reflected on a windshield of a motor vehicle.

An important feature of an inventive method, as compared to the methods of the prior art, is that a plurality—at least two—image data sets resulting from the projection are recorded from different camera positions and/or camera viewing angles in a calibration phase.

By recording a plurality—at least two—image data sets from diverse camera positions and/or camera viewing angles, it is possible to tune the display—for example, the display of a head-up display—by using suitable display-related pre-distortion parameters such that the diverse viewing positions and/or viewing angles yield a distortion-free or approximately distortion-free display.

The invention considers, inter alia, the fact that in viewing from different viewing positions and/or viewing angles, various areas of the surfaces and/or volumes of the optical elements involved affect the display. In order to compensate for the effect of imaging error sources, which affect various areas of the optical elements, the image data on a plurality of viewing positions and/or viewing angles must be available.

For the display of image elements, which are to be displayed in a certain time period, just a single set of display-related pre-distortion parameters is required. However, the optimal set of display-related pre-distortion parameters for the respective time period depends on the current viewing position in the respective time period and/or on the current viewing angle in the respective time period. Depending on the embodiment of a method according to the invention, either an optimal set of display-related pre-distortion parameters is defined and used for each time period; or a single set of display-related pre-distortion parameters, with which a satisfactory display quality can be expected for various viewing positions and/or viewing angles, is determined.

According to a number of different embodiments of the invention, the display-related pre-distortion parameters, which are to be used for pre-distortion in the operating phase, are determined on the basis of temporary sets of pre-distortion parameters, which are obtained in the calibration phase. The temporary sets of pre-distortion parameters are usually assigned to a specific viewing position and/or a specific viewing angle.

According to a simple embodiment of the invention, a temporary set of pre-distortion parameters is obtained by comparing the recorded image data sets with the original image data for all of the camera positions and/or camera viewing angles, at which image data were recorded. The working steps, which must be carried out for the various camera positions and/or camera viewing angles, are very similar and do not require a significant increase in the preparation complexity for the calibration phase. Especially when the calibration phase does not coincide temporally with the operating phase, a potential increase in the execution time of this part of the calibration phase can usually be easily tolerated.

The comparison of the recorded and original image data and/or the determination of temporary sets of pre-distortion parameters can be carried out, according to the invention, either completely or partially by an additional computer unit, which is connected to the computer unit of the head-up display only in the calibration phase.

Instead of a direct comparison of the recorded image data sets for all of the camera positions and/or camera viewing angles with the original image data, a joint processing of the recorded image data sets upstream of determining the temporary sets of pre-distortion parameters is contemplated, according to a more complex embodiment of the invention. Then, the determined temporary sets of pre-distortion parameters can relate to viewing positions and/or viewing angles that are different from the camera positions and/or camera viewing angles.

As an alternative, certain embodiments of the invention dispense with determining the temporary sets of pre-distortion parameters. Then, a database for determining a suitable set of display-related pre-distortion parameters is obtained directly from the recorded image data.

According to a first variant of a method of the invention, the image can be recorded in the calibration phase in that the recorded image data sets are recorded chronologically in succession from different camera positions and/or camera viewing angles by means of a single camera. The use of a single camera reduces, in particular, the complexity of the equipment required to carry out a method according to the invention.

As an alternative, the image can be recorded, according to a second variant of a method of the invention, from different camera positions and/or camera viewing angles in the calibration phase in that at least one image data set is recorded by means of a plurality—at least two—cameras, which are mounted in various positions and/or viewing directions. The use of several cameras reduces the complexity of positioning the cameras and optionally the amount of time for recording the image, especially when the cameras are used temporally in parallel or with little time offset and/or when these cameras are connected together mechanically, for example, by way of a common carrier unit.

In this respect, the complete temporal parallelization of the image recording and/or the complete hardware-related uncoupling of the image recording of the individual image data sets has an especially advantageous effect. In order to totally uncouple the image recording of the individual image data sets by way of the hardware, exactly one image data set is recorded according to a further development of the second variant of the invention, by using at least two cameras, which are mounted in various positions and/or viewing directions, in the calibration phase.

In the event that an inventive method is used for a distortion-free display of image elements projected on a windshield of a motor vehicle, the cameras that are used for image recording are positioned in the motor vehicle and/or mounted on the motor vehicle preferably exclusively for recording images in the calibration phase.

According to a further development of the invention, a pre-distortion is carried out by use of optical elements in both the calibration phase and the operating phase in addition to the pre-distortion by way of the computer unit. Therefore, the optical elements must be arranged in a manner that is well known between the display unit and the reflective surface. Their effect must be taken into consideration in the inventive pre-distortion.

According to an especially preferred variant of this further development of the invention, the effect of the predictable static imaging error sources is largely compensated by the optical elements.

According to a first preferred embodiment of the invention, a single set of display-related pre-distortion parameters that are provided for use in the operating phase is determined in the calibration phase; and this single set of display-related pre-distortion parameters is used independently of the current viewing position and/or the current viewing angle for calculating pre-distorted image data in all time steps of the operating phase. This single set of display-related pre-distortion parameters is independent of the current viewing position and/or the current viewing angle. Such a single set of display-related pre-distortion parameters must be created according to the invention in such a manner that with its use an average (optionally a weighted average) optimal display quality— especially freedom from distortion—over a plurality of viewing positions and/or viewing angles is a matter of fact. Ideally, the result is a satisfactory display quality for the entire range of values of possible viewing positions and/or viewing angles.

In the simplest case, the single set of display-related pre-distortion parameters is determined by forming a suitable, if desired, weighted average from the temporary sets of pre-distortion parameters obtained for various viewing positions and/or viewing angles. By means of a potential different weighting of the viewing positions and/or viewing angles and/or the temporary sets of pre-distortion parameters that are assigned to the viewing positions and/or viewing angles, conscious reductions in the display quality for viewing positions and/or viewing angles that are relevant only in exceptional situations can be accepted in favor of a better display quality for very frequent viewing positions and/or viewing angles.

It is true that optimization of an average value (if desired, weighted average) of the display quality over a plurality of viewing positions and/or viewing angles does not usually yield the optimum display quality for a certain viewing position and/or a certain viewing angle. However, the described first preferred embodiment of the invention does compensate better for the influence of static imaging error sources than would be possible with the devices, according to the prior art. In addition, a skillful layout may decrease the influence of the dynamic imaging error sources, in particular a change in the viewing position and/or the viewing angle. This is possible, since the display-related pre-distortion parameters and the projection of the display unit are optimized according to the invention differently than according to the prior art; that is, they are not optimized for a single eye point.

According to a second preferred embodiment of the invention, a single set of display-related parameters that are provided for use in the operating phase is not established in the calibration phase. Instead, a database for determining the display-related pre-distortion parameters as a function of the current viewing position and/or the current viewing angle is determined in the calibration phase. Not until the operating phase is the actually used set of display-related pre-distortion parameters determined as a function of the current viewing position and/or the current viewing angle on the basis of the data base determined in the calibration phase.

In the simplest case, a plurality (at least two) of different temporary sets of pre-distortion parameters are obtained in the calibration phase and stored in a look-up table. In this simplest case the stored temporary sets of pre-distortion parameters serve in the operating phase as a data base for determining the set of display-related pre-distortion parameters that must actually be used. It can be used directly as the set of display-related pre-distortion parameters for viewing positions and/or viewing angles, at which a temporary set of pre-distortion parameters was stored. Intermediate values and boundary values of the viewing position and/or the viewing angle are determined by, for example, linear or polynomial interpolation and/or extrapolation.

As an alternative, a database, which is generated in the calibration phase for determining a set of display-related pre-distortion parameters as a function of the current viewing position and/or the current viewing angle, can be designed as a continuous function or as a family of characteristics.

It is especially advantageous to obtain and store a data base, which permits a set of display-related pre-distortion parameters for a certain viewing position and/or a certain viewing angle to be determined with very little complexity and/or in a very short period of time, thus minimizing the computational complexity and/or the computation time in the operating phase. In the event of a dynamic change in the viewing position and/or the viewing angle, the set of display-related pre-distortion parameters that are used can also be adapted in step with said dynamic change.

The second preferred embodiment of the invention is very advantageous especially when the viewing position and/or the viewing angle (that is, the position of the driver's eye and the driver's direction of gaze) is/are known. According to a further development of this second preferred embodiment of the invention, the position of the eye and/or the direction of gaze of the driver of the motor vehicle is/are measured continuously in the operating phase; and/or an estimated value for the position of the eye and/or the direction of gaze of the driver is computed continuously. Furthermore, a set of pre-distortion parameters that are suitable for the currently measured and/or estimated position of the eye and/or the direction of gaze is determined.

The influence of the dynamic imaging error sources, in particular a change in the viewing position and/or the viewing angle, can be completely compensated by use of the described second preferred embodiment of the invention.

European patent document EP 0 946 893 B1 discloses an information display system for at least one person. In this system, a distortion, which is caused by the curvature of a windshield and is a function of the viewer's position, is compensated in that an inverse distortion is displayed by a video display, which acts as a display unit, and is reflected into the windshield. In order for the eye of the user to see the displays emitted by the video display at any time, it is known from EP 0 946 893 B1 to provide a video camera, which is focused on the person and which ascertains and tracks the location of the eyes of the person or the user and controls accordingly an optical means to this end. The video camera delivers the necessary position coordinates from observing the driver so that the respective image to be displayed on the video display is suitably corrected electronically. The pre-distorted images can be produced, according to EP 0 946 893 B1, by testing or are calculated with CAD data of the windshield and beam path computational programs. However, the major drawback with the procedure, described in EP 0 946 893 B1, as compared to the method of the invention, is that testing in the field is very time consuming and labor intensive, can be performed only by a person skilled in the respective art and does not always guarantee that satisfactory results will be achieved. The production of pre-distorted images with CAD data of the windshield and beam path computational programs can compensate, in turn, only the effect of predictable static imaging error sources.

The past designs relate to keeping pace with the process of providing a set of display-related pre-distortion parameters that are suitable for a distortion-free display. A plethora of methods are known for carrying out the necessary pre-distortion in the operating phase.

Prior art methods often use a table-based coordinate displacement. As stated in the introductory part, such methods usually cannot be carried out in real time in a motor vehicle.

According to a further development of the invention, a polygonal-based or polynomial-based pre-distortion method is applied for carrying out in real-time the pre-distortion on the basis of the set of display-related pre-distortion parameters that are determined for the respective time step. This enables a mathematical description of even complex distortions with a comparatively small number of parameters. Nevertheless, polynomials are extremely easy to calculate, a feature that makes it possible to integrate the calculation of pre-distorted displays from sets of pre-calibrated pre-distortion parameters even in FPGA or ASIC designs. Owing to the properties of the elements that are used for generating an image as well as owing to the projection surface (for example, front windshield) the imaging errors, caused by the production tolerances, can be corrected with the aid of a polynomial-based pre-distortion procedure in such a manner that the remaining distortions are below the human limits of perception. Such a polygonal or polynomial method makes it possible especially for graphics processors, which can be used today in motor vehicles, to have real time capabilities even in the event of rapid changes in the viewing position and/or the viewing angle.

According to the invention, a suitable graphics processor (for example, Fujitsu Coral family, Silicon Optix T1/W1) is used as the computer unit or as a part of the computer unit for the pre-distortion. Such graphics processors can distort and/or pre-distort image data to be projected either over traverses (Fujitsu) or over polynomials up to the 5th power. By using polygonal-based or polynomial-based methods, the number of pre-distortion parameters that are to be processed and made available is drastically reduced. The necessary coding time in a calibration phase that takes place at the production site is significantly decreased as compared to the table-based methods. Following the pre-distortion of the image data to be projected, the graphics processors of the aforementioned type also permit a respective anti-aliasing, a feature that reduces the necessary resolution of the display of the projection unit for the pre-distortion and, thus, lowers the costs.

The process that runs in the calibration phase for the purpose of obtaining a database that is suitable for a polygonal-based or polynomial-based method must be tuned to the demands on the database that is required in the operating phase.

According to an especially advantageous embodiment of the invention, the computational operations that are to be carried out in the calibration phase—in particular, determining a single set of display-related pre-distortion parameters or determining a data base for determining the display-related pre-distortion parameters that are a function of the current viewing position and/or the current viewing angle—are carried out totally or partially by an additional computer unit that is connected to the computer unit only in the calibration phase.

The display area of a display unit that is employed in a method of the invention has to be larger than in a method without a pre-distortion, which is realized by data processing, for the same effective projection surface, because pixels on the display due to pre-distortion must appear outside the hitherto display area.

The resolution of the display of the display unit must be so high that the pixel spacing of the projected image elements is less than the detectability limit of the human eye. If the pixel spacing in the projected image is slightly above the detectability limit of the human eye, a post-filter anti-aliasing may help to avoid the digitizing effect of the pre-distortion.

Other objects, advantages and novel features of the present invention will become apparent from the following detailed description of the invention when considered in conjunction with the accompanying drawings.

DETAILED DESCRIPTION OF THE DRAWINGS

In a head-up display in a motor vehicle, the graphical and textual information is bundled in the driver's field of vision by a reflection on the windshield of the motor vehicle. The head-up display includes, in essence, a computer unit, which generates the image elements to be displayed; a display unit, which projects the image elements on the windshield; and optical elements, which are arranged between the display unit and the windshield (here, a mirror system) for influencing the beam path of the light, emitted by the display unit.

Owing to the effect of the optical elements during the projection on the windshield, the distorting effect of the basic shape of the windshield and its arrangement in relation to the display unit and the optical elements—in particular, also the subjectively imperceptible imaging errors—is reduced, but not totally compensated for any viewing position.

In order to obtain a distortion-free display from the driver's viewpoint, the image elements to be displayed are pre-distorted, according to the display-related pre-distortion parameters, in the computer unit prior to the projection.

In an operating phase of the head-up display that can be activated by the driver of the motor vehicle, the computer unit generates pre-distorted image data, which are to be projected, at a predefined refresh rate.

According to a preferred embodiment of a method of the invention, a computer unit in the present embodiment defines in real-time a set of display-related pre-distortion parameters for each time period, and the set of display-related pre-distortion parameters is used in the respective time period for the pre-distortion.

If a camera-based system is available for determining and tracking the position of the driver's eye and the driver's direction of gaze (eye tracking system), which is assumed in the present embodiment according to a preferred further development of the invention, the set of display-related pre-distortion parameters can be determined from a polynomial function as a function of the current position of the driver's eye, thus achieving a display that is tuned to the position of the driver's eye and is, therefore, in essence less distorted.

The position of the driver's eye is measured quasi-continuously by the eye tracking system and is transferred to the computer unit at a predefined refresh rate. The polynomial function for determining the set of display-related pre-distortion parameters as a function of the current position of the driver's eye was determined in a calibration phase that runs chronologically before the operating phase.

Figure 1:
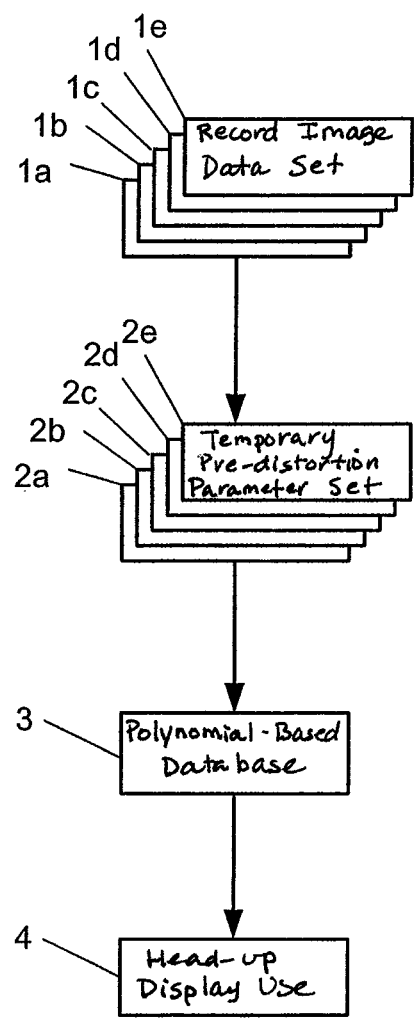
FIG. 1 is a schematic drawing of the principle process steps of a preferred embodiment of a method of the invention.

FIG. 1 shows the principle process steps of both the calibration phase and the operating phase of the preferred embodiment of the method according to the invention described herein.

In the calibration phase, a plurality of cameras—in this case five, —which are mounted on a common carrier frame, record a respective set of image data (here, an image in total camera resolution) of a test image that is projected by the head-up display on the windshield. As an alternative, one may also work with just one camera that is mounted in a moveable manner. The important factor is to obtain image data from a plurality of positions in the so-called eye box (for example, the corners).

The computer unit of the head-up display uses an initial set of display-related pre-distortion parameters for the pre-distortion of the test image. Depending on the exact embodiment of the method, the set may be designed in such a manner that with its use there is no pre-distortion at all, or the pre-distortion is extremely small. Or the initial set of display-related pre-distortion parameters can be designed in such a manner, for example, as an average value of the sets of pre-distortion parameters that were defined beforehand for the position of the eye of a driver, who is sitting upright and is of average height, in motor vehicles of that type of set that the distortion of the projected image that is caused by the windshield and the optical elements is largely compensated.

The image data, recorded by the five cameras (FIG. 1 shows the recording of the image by the five process steps 1a, 1b, 1c, 1d and 1e), are fed to the same image processing. In the present embodiment, the image is processed by an additional computer unit, which has a larger memory capacity and computational power, and is different from the computer unit, which is used in the operating phase and is part of the head-up display.

Figure 2:
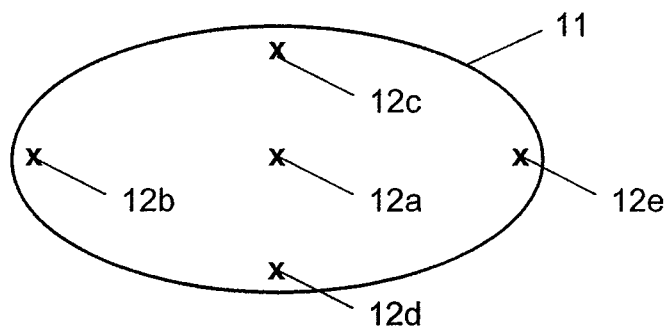
FIG. 2 is a schematic drawing of the range of values of possible positions of the eye of the driver of a motor vehicle as well as various positions of a camera that is used for recording an image in the preferred embodiment of a method of the invention.

The camera positions are chosen so as to achieve good coverage of the value range of all possible positions of the eye of a driver of the motor vehicle. FIG. 2 is a schematic drawing depicting the statically determined value range 11 of all possible positions of the eye of the driver for a certain type of motor vehicle and for the five camera positions 12a, 12b, 12c, 12d and 12e that are used for recording images in the described embodiment. The central camera position 12a corresponds to the position of the eye of a driver, who is sitting upright and is of average height. The camera positions 12b, 12c, 12d and 12e correspond to four extreme positions of the eye in the vicinity of various limits of the value range 11. The camera positions 12a, 12b, 12c, 12d and 12e can, but do not have to, be in a plane.

In order to be able to reproduce as accurately as possible the five aforementioned positions of the eye by way of the respective camera positioning in the positions 12a, 12b, 12c, 12d and 12e, the cameras (and/or if only one camera with motion capability is used then that camera including its movement apparatus) is mounted permanently on a carrier frame, which is positioned so as to be defined in relation to the motor vehicle even if it is fixed on the door frame of the driver's door. The carrier frame and the cameras are mounted in or on the motor vehicle only for recording images in the calibration phase.

The additional computer unit is fed not only the image data sets of the cameras but also the undistorted image data that are to be projected from the head-up display. On the basis of a well-known correlation process, which compares the image data sets of the cameras with the undistorted image data to be projected, the additional computer unit calculates a temporary set of pre-distortion parameters for each recorded set of camera image data.

In FIG. 1 the calculation of the five temporary sets of pre-distortion parameters is shown by the process steps 2a, 2b, 2c, 2d and 2e.

In process step 3, the additional computer unit determines from the five temporary sets of pre-distortion parameters and the associated camera positions a polynomial-based database for determining a set of display-related pre-distortion parameters, as a function of the current position of the eye of the driver. This database is transferred to the computer unit of the head-up display. The calibration phase is terminated upon completion of process step 3.

Process step 4, which is depicted in FIG. 1, consists of the above-described distortion-free visualization by use of the head-up display on the basis of the data base, which is obtained in the calibration phase and is intended for determining a set of display-related pre-distortion parameters, as a function of the current position of the eye of the driver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for displaying image elements, composed of computer-generated pixels and reflected on a non-planar reflective surface, for a substantially distortion-free display the method comprising the acts of:
    calculating pre-distorted image data by a computer unit in an operating phase, based on distortion characteristics of the reflected surface, from original image data of the image elements in accordance with pre-distortion parameters related to a display;
    transferring the pre-distorted image data to a display device, and projecting image elements onto the reflective surface;
    in order to obtain the pre-distortion parameters related to the display device, in a calibration phase recording at least two image data records captured from at least one of different camera positions and camera angles, the recorded at least two image data records resulting from a projection of at least one image element that is pre-distorted and projected in a form of original image data using a same procedure as in an operating phase, wherein the recorded at least two image data sets is compared with the original image data.

2. The method according to claim 1, wherein in the calibration phase, the at least two recorded image data sets are recorded chronologically in succession from the at least one of the different camera positions and the camera viewing angles using a single camera.

3. The method according to claim 2, wherein in both the calibration phase and the operating phase, in addition to pre-distortion via the computer unit, a pre-distortion is performed via optical elements arranged in front of the reflective surface.

4. The method according to claim 2, wherein the method is used for the substantially distortion-free display of image elements projected on a windshield of a motor vehicle, and that the cameras that are used for recording the image are positioned in the motor vehicle and/or mounted on the motor vehicle exclusively for recording images in the calibration phase.

5. The method according to claim 1, wherein at least one of the at least two image data sets is recorded by way of at least two cameras, which cameras are mounted in at least one of different positions and viewing angles.

6. The method according to claim 5, wherein in both the calibration phase and the operating phase, in addition to pre-distortion via the computer unit, a pre-distortion is performed via optical elements arranged in front of the reflective surface.

7. The method according to claim 1, wherein in both the calibration phase and the operating phase, in addition to pre-distortion via the computer unit, a pre-distortion is performed via optical elements arranged in front of the reflective surface.

8. The method according to claim 1, wherein in the calibration phase, a single set of pre-distortion parameters is determined independently of a current viewing position and/or a current viewing angle.

9. The method according to claim 1, wherein the display-related pre-distortion parameters are determined in the operating phase, as a function of the current viewing position and/or the current viewing angle.

10. The method according to claim 9, wherein a data base for determining the display-related pre-distortion parameters as a function of the current viewing position and/or the current viewing angle is determined in the calibration phase.

11. The method according to claim 10, wherein at least one of an actual position and an estimated position of the eye and/or a direction of gaze of a driver of the motor vehicle is measured continuously in the operating phase; and a set of pre-distortion parameters suitable for the currently measured and/or estimated position of the eye and/or the direction of gaze is determined.

12. The method according to claim 9, wherein at least one of an actual position and an estimated position of the eye and/or a direction of gaze of a driver of the motor vehicle is measured continuously in the operating phase; and a set of pre-distortion parameters suitable for the currently measured and/or estimated position of the eye and/or the direction of gaze is determined.

13. The method according to claim 1, wherein a data base for determining the display-related pre-distortion parameters as a function of the current viewing position and/or the current viewing angle is determined in the calibration phase.

14. The method according to claim 13, wherein at least one of an actual position and an estimated position of the eye and/or a direction of gaze of a driver of the motor vehicle is measured continuously in the operating phase; and a set of pre-distortion parameters suitable for the currently measured and/or estimated position of the eye and/or the direction of gaze is determined.

15. The method according to claim 1, wherein computational operations that are carried out in the calibration phase are at least partially performed by an additional computer unit operatively coupled to the computer unit only in the calibration phase.

16. The method according to claim 15, wherein the computational operations comprise at least comparing the recorded image data with the original image data and/or determining a data base for determining display-related pre-distortion parameters as a function of a current viewing position and/or a current viewing angle.

17. A method of displaying image elements composed of computer-generated pixels reflected on a non-planar reflective surface in a motor vehicle, the method comprising the acts of:

in an operating phase of a display unit, calculating pre-distorted image data based on distortion characteristics of the non-planar reflective surface from original image data of the computer-generated pixels as a function of pre-distortion parameters of the display; and transferring the pre-distorted image data to the display unit for projecting the image elements onto the non-planar reflective surface;

obtaining the pre-distortion parameters of the display by, in a calibration phase, projecting pre-distorted image data in the form of original image data using a same procedure as in the operating phase and recording at least two image data records for comparison with the original image data, wherein the at least two image data records are captured from at least one of different camera positions and different camera angles.

18. The method according to claim 17, wherein the pre-distortion parameters of the display are further determined in the operating phase as a function of at least one of a current viewing position and a current viewing angle of an operator.

19. The method according to claim 17, wherein a database for determining the pre-distortion parameters of the display as a function of at least one of a current viewing position and current viewing angle is determined in the calibration phase.

* * * * *